United States Patent

Kohler et al.

[15] 3,653,006

[45] Mar. 28, 1972

[54] ASSEMBLAGE ELEMENT FOR FUNCTIONAL UNIT

[72] Inventors: Bernard Claude Kohler, Paris; Gerard Philippe Manoussi, Creil; Serge Auguste Touron, Bagnolet, all of France

[73] Assignee: Societe Industrielle Honeywell Bull, Paris, France

[22] Filed: Dec. 24, 1969

[21] Appl. No.: 887,940

[30] Foreign Application Priority Data

Dec. 27, 1968 France ....................................181105

[52] U.S. Cl. ....................................................340/173 SP

[51] Int. Cl. ....................................................G11c 11/00

[58] Field of Search ..........................................340/173 SP

[56] References Cited

UNITED STATES PATENTS

| | | | |
|---|---|---|---|
| 3,504,132 | 3/1970 | Wallace | 179/90 |
| 2,613,252 | 10/1952 | Heibel | 175/298 |
| 3,028,659 | 4/1962 | Chow | 29/155.5 |
| 3,428,954 | 2/1969 | David | 340/173 |
| 3,161,859 | 12/1964 | Medwin | 340/173 |

*Primary Examiner*—Terrell W. Fears
*Attorney*—Fred Jacob, Ronald T. Reiling and Lewis P. Elbinger

[57] ABSTRACT

A read-only memory wherein a complete unit thereof is fabricated as a pluggable circuit board, the board being adapted to function with different storage components by supporting the storage components in a removable pluggable fashion, the board proper holding in fixed form those elements and circuits which are invariant for different storage components.

12 Claims, 8 Drawing Figures

ASSEMBLAGE ELEMENT FOR FUNCTIONAL UNIT

BACKGROUND OF THE INVENTION

This invention relates to improvements in assemblage elements for functional units useful in high performance data processing systems.

Various assemblage elements have been proposed for mounting integrated circuits in the form of elements which can be connected in a removable manner to an interconnection panel. However, generally these elements are not suitable for employment today, either because they do not permit taking full advantage of the speed of operation inherent in available integrated circuits, or because they are so complex that their cost is exaggerated.

More precisely, the assemblage element of this invention is intended to permit the most satisfactory possible realization of a unit of fixed memory, for example, of the resistance type, which includes the associated apparatus. Such a memory is sometimes designated as a "read-only memory," but also it can be considered as an electrical encoding device.

Because the employment of such a fixed memory is now tending to become general in high speed information processing systems, and because its storage capacity must be considerable, it is of the greatest importance that these different elements have the property of being fabricated and produced economically. Moreover, such elements must be compatible with an extremely short memory cycle time, namely, of the order of a few 10's of nanoseconds.

In one current application it is required that a fixed memory have a storage capacity of 4,096 words of 40 binary digits, or bits, for example. As the miniaturization of the components is extended to the maximum, it is necessary to provide for the realization of a fixed memory of such capacity in several assemblage elements, especially since it is desired to incorporate the associated apparatus, such as a switching matrix, the intermediate amplifiers, and the output-read amplifiers. Therefore, in the present example, the fixed memory proper will be composed of eight assemblage elements, designated "memory elements," each representing a capacity of 512 words of 40 bits. Moreover, the complete memory system is able to include the logic circuits similarly mounted on pluggable elements designated "logic elements." For example, a logic element serves to support an address register and a decoding device, whereas another logic element serves to support an output register having a capacity of 40 bits.

The primary object of this invention is to provide for the construction of a memory element as defined above, which is inexpensive to fabricate and to employ, and wherein the exterior dimensions and the manner of plugging are the same as those of the logic elements.

Another object of the invention is to provide for the realization of a memory element as defined above, wherein the paths of electrical information are optimized, that is to say, as short as possible without bends. One such optimization is reflected in a simplification of the construction of the interconnection panel.

Another object of the invention is to provide for the realization of a memory element as defined above, and containing several resistance memory planes, wherein the addresses of the word lines progress in a continuous and linear fashion, thereby greatly simplifying the coding of the memory planes during their initial production, as well as their eventual repair of modification.

SUMMARY OF THE INVENTION

The concept of the invention is to provide a pluggable assemblage element of memory with a principal pluggable board carrying the comparatively more costly circuits and provided with a second level of plugging in order to support in removable fashion two card-planes carrying the comparatively less costly circuits. Thus, these card-planes can be easily replaced by others when it is desired to utilize fixed memories with different codes. This situation will occur fairly frequently because these fixed memories generally store the microinstructions of programs and/or tables of data constants, etc. A supplemental advantage of this assemblage element lies in the speed of the intervention which is enabled at the time of repair of a defective element.

Consequently, in accordance with the invention, there is provided an assemblage element of circuits for connecting together a fixed resistor memory, comprising a principal rectangular board, provided with an edge which has contact pads on its two faces by which the board is pluggable into a corresponding connector. The principal board carries, opposite from said edge thereof, at least one connector on each of its two faces. Each connector receives a pluggable card-plane disposed parallel to and at a distance from the principal board. Each card-plane is composed of a rectangular insulting board, which carries on each of its two faces, in addition to printed circuits, a resistor memory plane and a transistor switching matrix intended for the selection of the word lines of the memory. The principal board also carries on each of its two faces, between the connector and the contact pads, several read amplifiers connected to the memory planes and several coupling circuits.

On the pluggable edge of the principal board, the contact pads are divided into two groups, namely, one group for the command inputs to the switching matrix and the other group for the outputs of the read amplifiers.

BRIEF DESCRIPTION OF THE DRAWING

The invention will be described with reference to the accompanying drawing, wherein.

DESCRIPTION OF THE PREFERRED EMBODIMENT

Figure 1:
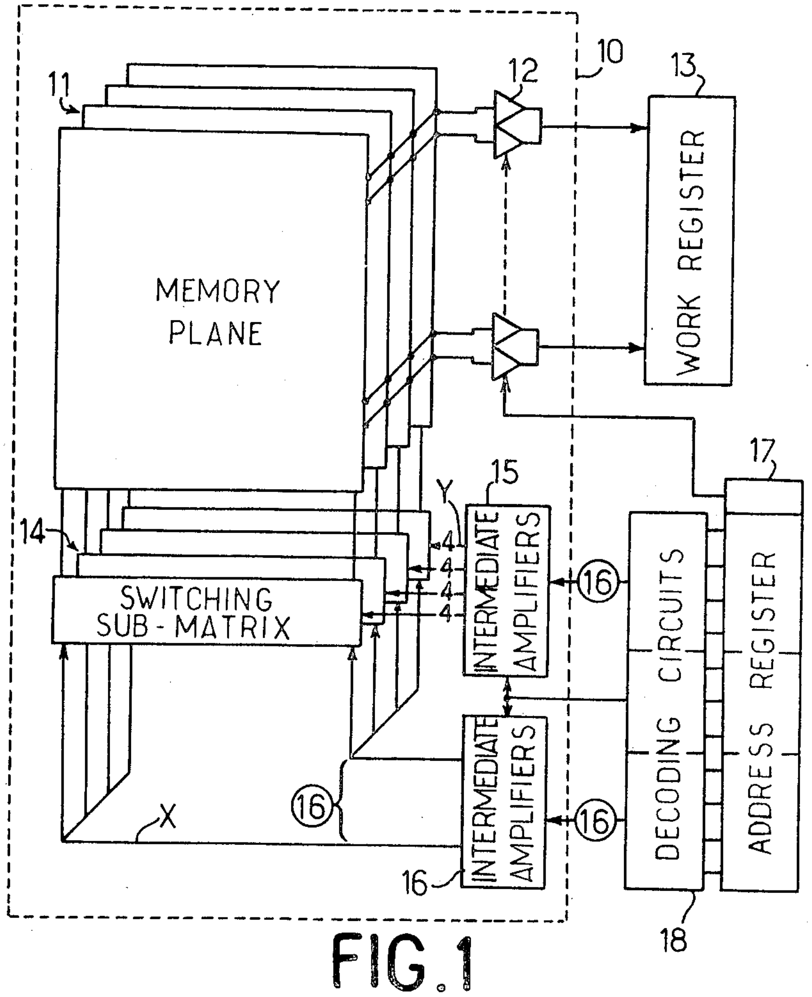
FIG. 1 is a block diagram of a unit of the fixed memory with associated logic devices.

In FIG. 1 are visible, in the interior of a rectangle 10, the components which constitute an assemblage element in accordance with the invention. If, as has been indicated previously, by way of example, this assemblage element is provided for supporting a part of the fixed memory having a capacity of 512 words of 40 bits, this capability is provided in fact by four memory planes 11, each plane corresponding to 128 words of 40 bits.

For some purposes it is preferred that each plane contain 64 words of 80 bits, whereupon a binary selection is effected in retrieval, by means of a bit of the address, for choosing between the two words thus available, as will be explained later.

The principle of a resistive fixed memory will now be reviewed. In the present instance, each plane comprises 64 word conductors disposed parallel to a first direction, 80 bit conductors disposed parallel to a direction which is orthogonal to the first direction, and coupling resistors connecting the word conductors to the bit conductors, but only at those conductor intersections where a binary "1" must be stored. When voltage is applied to a word conductor of a given address, there appear usable signals on the bit wires which correspond to the code of the selected word. Each bit conductor is connected to a resistor of relatively small value, the resistor being connected to or a part of the input circuit of a read amplifier.

This type of fixed memory has been described in several patents, particularly in the French Pat. No. 1,382,986, filed Sept. 27, 1963, and the corresponding U.S. Pat. No. 3,383,663, issued May 14,1968. There is represented in FIG. 1 two double read amplifiers 12 having their inputs connected to the bit conductors of the memory planes 11. The 40 outputs of these amplifiers are connected to work register 13 having the same number of storage positions. Each double amplifier may be of the same type as that described in French Pat. application P.V. 154,069, filed June 7, 1968, for "Amplifier Network For Small Signals," corresponding to U.S. Pat. application Ser. No. 827,006, filed May 22, 1969, which U.S. application has since become abandoned.

A transistorized switching matrix 14 is composed of four rectangular sub-matrices. Since the square matrix is equivalent to 256 outputs, it has 16 command lines X and 16 command lines Y. Each sub-matrix comprises, therefore, 16 command lines X and four command lines Y, the command lines X of the same weight in the four sub-matrices being connected in parallel. Blocks 15 and 16 each symbolize 16 intermediate amplifiers, each having to furnish appreciable power at the required voltage level.

Block 17 represents an address register and block 18 a set of circuits for decoding the addresses. In the present example, the address register comprises four stages for representing one of the 16 command lines X, four stages for representing one of the 16 command lines Y, three stages for representing one of the eight assemblage elements provided, the selection operating through the level of the intermediate amplifiers, and finally a stage for controlling the selection of the one of the two words of 40 bits appearing at the output of the memory. The word register 13, the address register 17, and the decoding circuits 18 are part of the logic elements which are connected to the elements of the memory through the intermediary of the common interconnection panel.

Figure 2A:
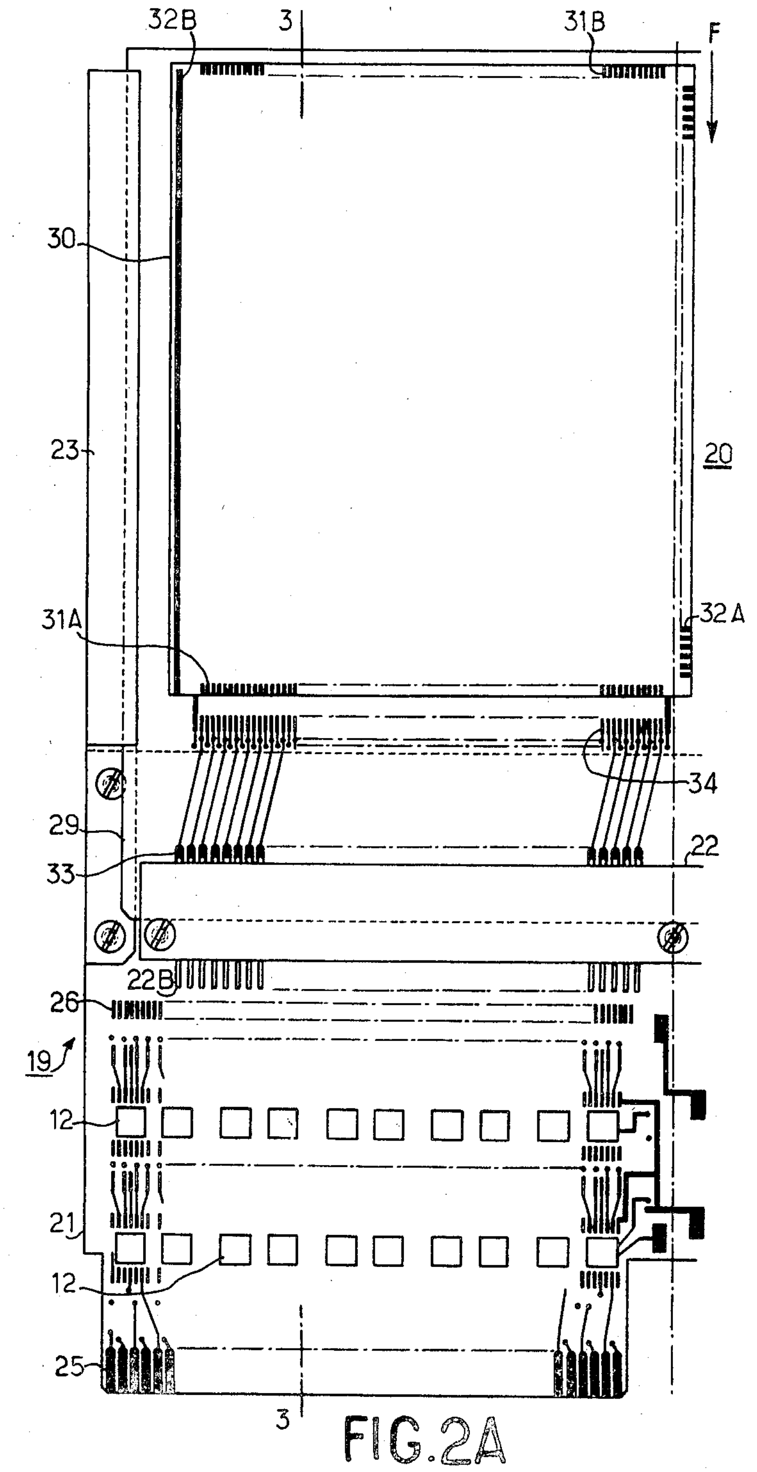
FIGS. 2A and 2B are an elevational view of an assemblage element in accordance with the invention, the view having two halves which are not totally symmetrical, each of which is shown in the two figures.
Figure 2B:
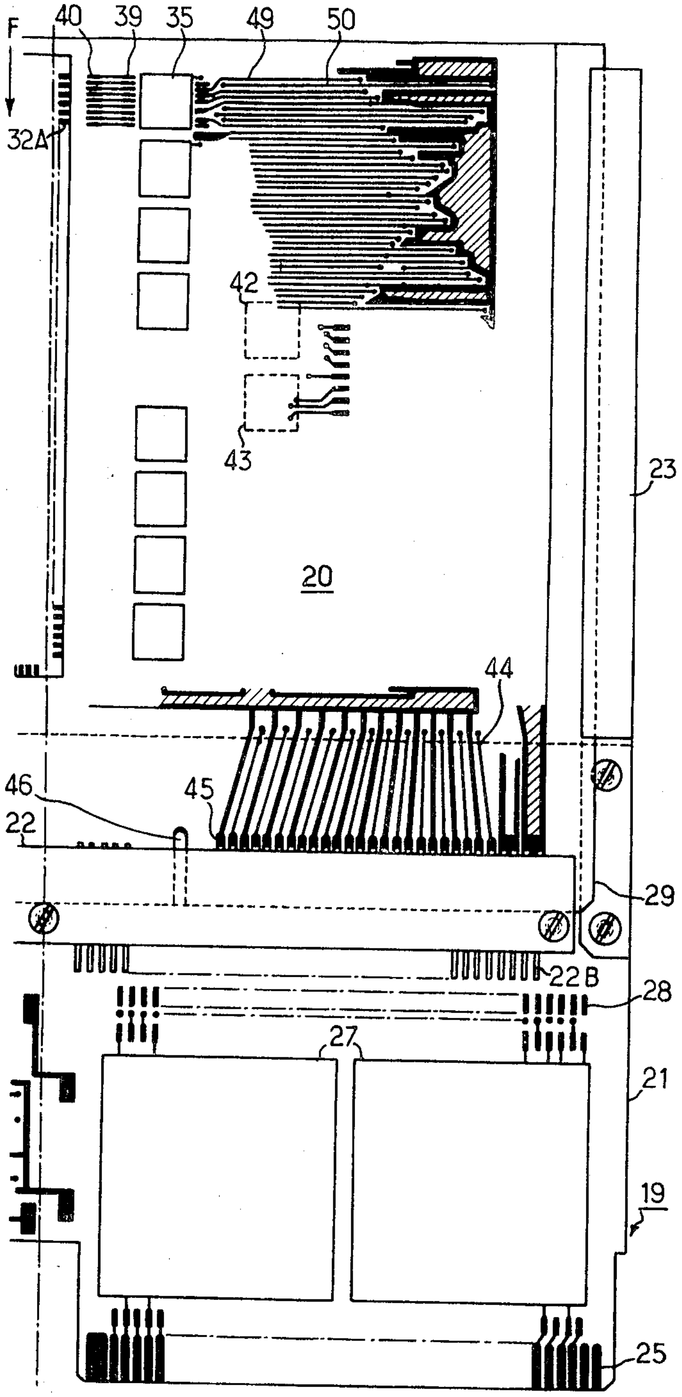
Figure 3:
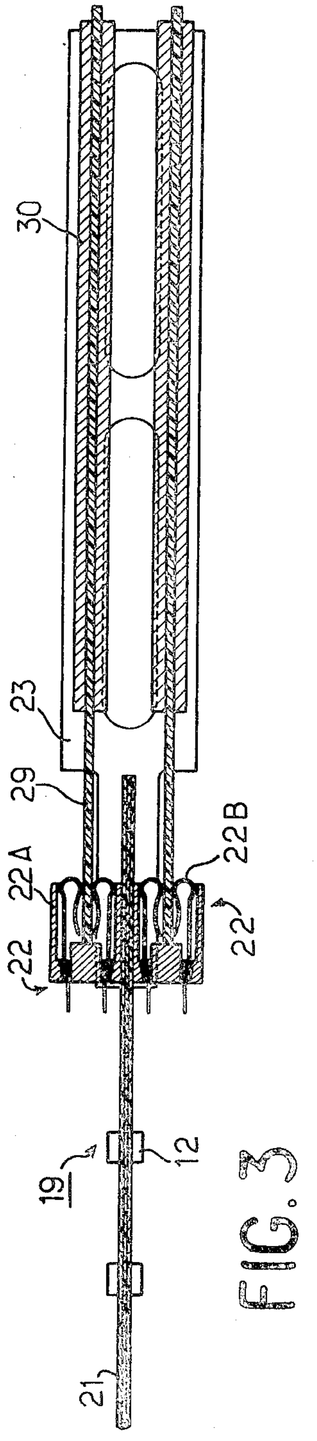
FIG. 3 is a cross-sectional view of the assemblage element taken on the lines 3—3 of FIG. 2A.
Figure 4:
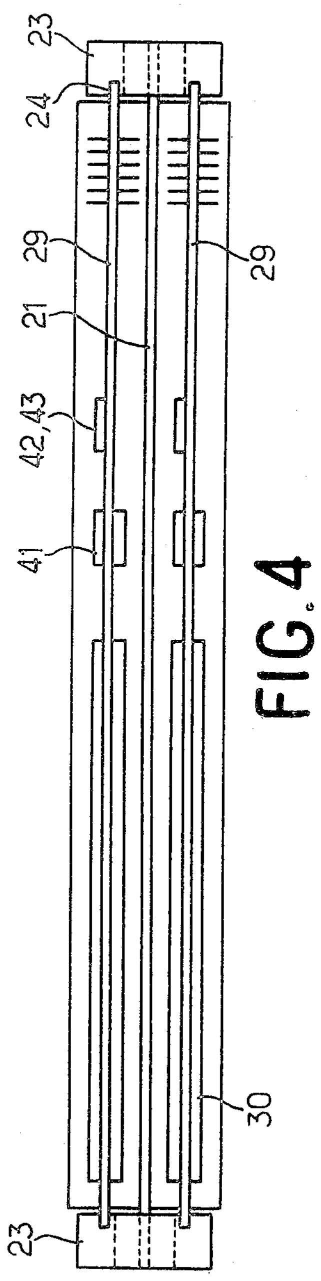
FIG. 4 is an end view of the assemblage element looking in the direction of the arrows F of FIGS. 2A and 2B.

FIGS. 2A, 2B, and 3 illustrate that a memory assemblage element 10 comprises essentially a principal board 19 and two card-planes 20. The principal board 19 comprises a central card 21, on the upper part of which are affixed two connectors 22, one arranged as the opposite of the other, each on one face of the central plate, and two upright-guides 23. Each guide 23 comprises a slotted part for permitting its fitting and fastening to the upper part of card 21. FIGS. 2A, 2B, 3 and 4 show that the upright-guides 23 carry, along a part of their length, two channels 24 intended to guide the card-planes 20 at the time of their plugging and to support them with proper spacing.

A connector 22 comprises essentially a frame 22A of insulating material, with seats for holding contact prongs 22B in place. Prongs 22B are disposed in two parallel and opposed rows. Connector 22 may be of the type that is described in the French Pat. No. 1,541,094, filed Aug. 23, 1967, and the corresponding U.S. Pat. No. 3,543,226, issued Nov. 24, 1970. However, each connector can be replaced by two separate connectors so as to utilize equipment on hand. The required condition for such a replacement is to dispose of sufficient number of the contact prongs, their separation being 2.54 mm., for example.

Card 21 is composed of several sheets of insulating material supporting printed circuits, these sheets forming, after being bonded together, a multi-layer printed circuit element, wherein the total thickness may be 1.6 mm., for example. The lower edge is provided with contact pads 25 to correspond with a connector mounted on an interconnection panel, not shown.

On its left part (FIG. 2A) card 21 carries on each of its faces, front and back, twenty double output-read amplifiers 12, each of which can be of the type indicated previously. Being formed on integrated circuits, a double amplifier appears in the form of a parallepiped of small size with at most 14 solder leads.

Printed circuits appear on the exterior faces of card 21, the most notable being the solder pads to which are soldered the leads of amplifiers 12, the printed circuits of these amplifiers not being shown. In addition, there is provided a row of solder pads 26 which should be electrically connected to the ends of the contact prongs 22B of connector 22.

On its right part (FIG. 2B) card 21 carries on each of its faces, front and back, two blocks 27 of intermediate amplifiers, corresponding to those designated 15 and 16 in FIG. 1. Each block 27 comprises eight transistor amplifiers and two transistorized logic selectors. For technical reasons, each amplifier is composed of ordinary transistors, which has the disadvantage that each block is relatively large. This disadvantage can be alleviated with a hybrid construction, that is with discrete transistors and deposited resistors.

In addition to the solder pads connected to the inputs and outputs of the intermediate amplifiers, there is provided on each face of card 21 a row of solder pads 28, which should be electrically connected to the ends of the contact prongs 22B of connector 22.

Each of the two card-planes 20 is constituted essentially of a printed circuit card 29 serving as a support for other members. Card 29 may be formed of a sheet of insulating material, such as epoxy glass, and carries printed circuits on its two faces. Its total thickness similarly may be 1.6 mm.

On its left part, FIG. 2A, card 29 carries a memory plane 30 on each of its faces. This comprises a glass substrate, on one face of which are deposited resistors and two orthogonal sets of conductors at the appropriate time in the processing operation. This face, which is the exterior face, has 80 solder pads, such as 31A, on the lower edge of 80 solder pads, such as 31B, on the upper edge, in correspondence with the 80 bit conductors, not shown. This same face carries, on the right vertical edge, 64 solder pads 32A, corresponding to the 64 word conductors, and on the left vertical edge a common solder pad 32B.

On card 29, printed circuits connected contact pads 33 to solder pads 34, which, in turn, are connected to solder pads 31A by printed circuits on a flexible support, not shown.

On each face of the right part, FIG. 2B, of card 29 are disposed eight transistorized modules 35 constituting a switching sub-matrix entering into the composition of matrix 14 of FIG. 1.

Figure 6:
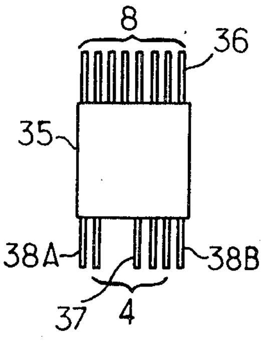
FIG. 6 is an elevational view of a module entering into the construction of the matrix.
Figure 5:
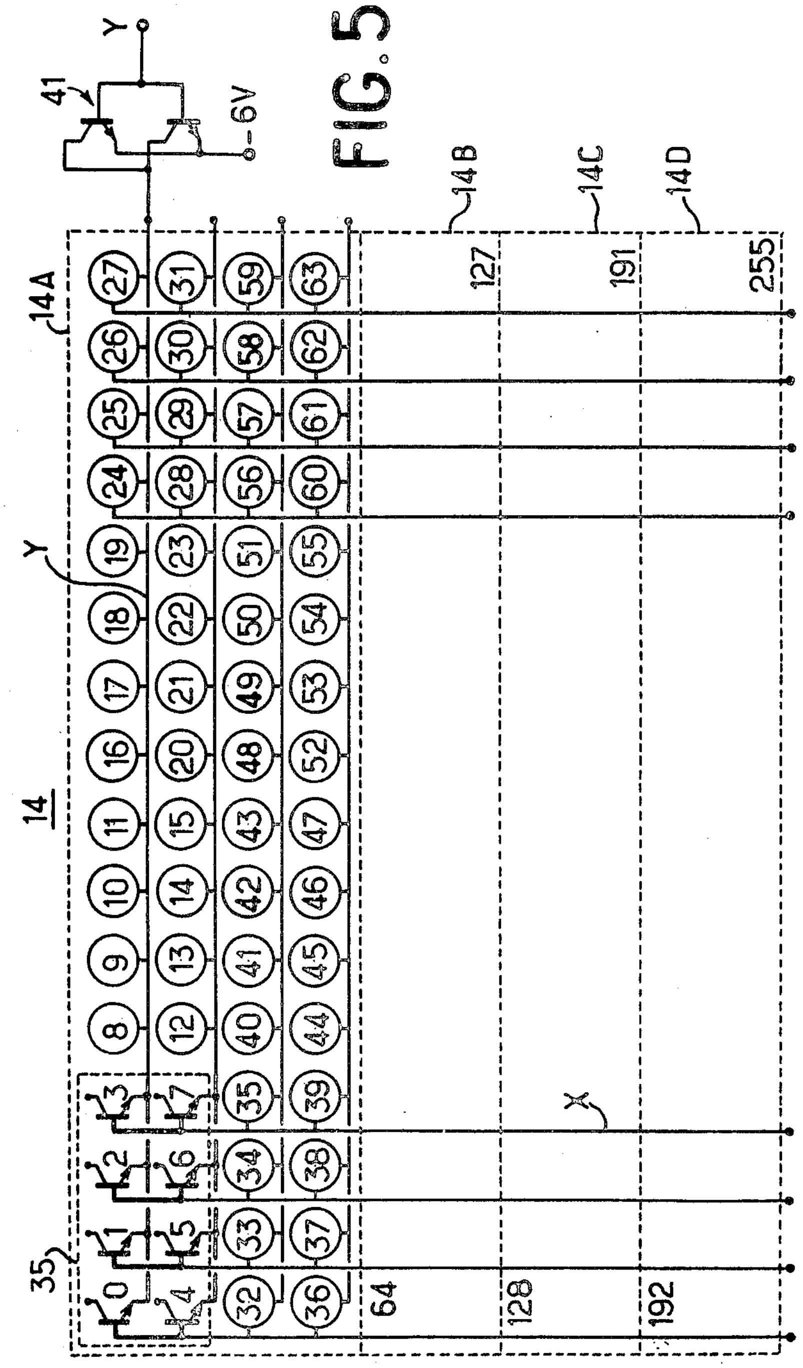
FIG. 5 is a simplified schematic diagram of a transistor switching matrix.

Reference will now be made to FIG. 5 for explaining the electrical construction of this matrix as well as the advantages resulting from this combination with the memory planes. The matrix is subdivided into four sub-matrices 14A, 14B, 14C, and 14D, only sub-matrix 14A being shown in detail. Each module 35 is fabricated advantageously with miniaturized discrete transistors by any appropriate method. In the interior of each module there are provided eight NPN transistors. The numbers 0 to 63 indicate the addresses of the word conductors of the associated memory plane. In effect, the collector of each transistor represents an output of the matrix and must be connected to the word conductor of corresponding address. By internal connection, the bases of a pair of these transistors, such as 0 and 4, 1 and 5, etc., are connected together. Similarly, the emitters of these transistors are connected together in two groups of four, namely 0 to 3, and 4 to 7. This module provides very advantageous characteristics, as can be determined with the aid of FIG. 6. The module has on one side eight output leads 36 corresponding to the collectors, and on the other side four base input leads 37 and two emitter input leads 38A and 38B. It is to be understood that all of the other connections represented on the drawing (FIG. 5) are realized by external printed circuits, and even possibly across to the contacts of connector 22. In this manner the matrix carries 16 command lines X, each corresponding to the bases of a column of transistors, as well as 16 command lines Y, four per sub-matrix, each corresponding to the emitters of a row of transistors.

Since on each module 35 the output leads 36 correspond to addresses of increasing numbers, for example, by aligning these modules side-by-side, parallel to the vertical right side of the memory plane, it is very easy to electrically couple with solder pads 32A (FIG. 2B) of the word conductors of the memory plane wherein the address numbers follow in the same increasing order. For this, the solder pads, such as 39, are soldered to the output leads 36 (not shown on the figure) of modules 35. The other end of the solder pads, such as 40, which are connected to the solder pads 39, can be individually connected to the solder pads 32A of the word lines by means of printed circuits on a flexible support, the latter also not being shown.

In order that the currents applied on the command lines Y (emitters) are of the same order of magnitude as the currents applied on the command lines X (bases) and that the signals applied to these two groups of lines X and Y are of the same polarity, an inverter amplifier is inserted in each command line Y. An example is shown at 41 on FIG. 5. Each amplifier is formed of a pair of NPN transistors connected in parallel, all of the emitters being connected to a terminal connected to a source of negative voltage. The modules used for this are the same as those which are used for the switching matrix. Since a module comprises four pairs of transistors, it may be associated with one of the four sub-matrices. FIG. 2B illustrates two modules 42 and 43 on the rear face of card 29, each being associated with one of the two sub-matrices implanted on the two faces of a card-plane.

On the printed circuits of one face of card 29, represented only partly, there appears at 44 the command lines which, the same as the ground connections, are connected to a series of contact pads 45 existing on each of the faces of card 29.

A tongue 46 is fixed to the frame of connector 22, opposite to a notch of corresponding shape cut in the lower edge of the right part of card-plane 20, in order that the latter cannot be mounted upside down.

Figure 7:
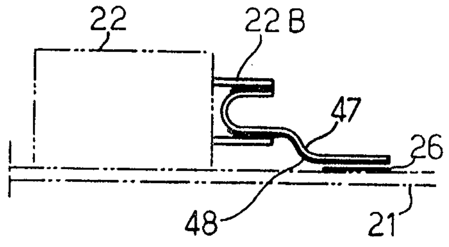
FIG. 7 is a detailed view serving to indicate how the solder pads can be connected to the ends of the contacts of a connector by printed circuits on a flexible support.

Referring now to FIG. 7, a means for connecting the ends of the contact prongs of connector 22 with solder pads 26 or 28 is shown as one of several possible solutions. A support 47 of flexible insulating material carries printed conductive strips 48. The flexible support is bent in the form of a U, one extremity of the conductive strips being soldered to the ends of prongs 22B before the connector is mounted. Then, after mounting the connector on the principal board, the flexible support being held in position, the soldering of the printed strips with the pads, such as 26, is effected by applying heat by any appropriate procedure across the width of the flexible support. It is to be understood that the ends of prongs 22B, the printed strips 48, and the solder pads 26 have been previously tinned.

The relative ease with which the 64 outputs of the switching sub-matrix may be coupled to the word conductors of the associated memory plane has been shown previously. If, for example, the addresses of the word conductors of plane 30 progress from 0 to 63, from low to high, the numbers of the 64 outputs of the eight modules 35 progress also in the same sense.

If it is assumed that the modules of sub-matrix 14A (FIG. 5) are disposed on the front face of the first card-plane, visible in FIGS. 2A and 2B, those of sub-matrix 14B will be disposed on the rear face of this card-plane. In order that the four memory planes of an assemblage element can be considered to be strictly analogous, both during the initial entry of the words and during eventual repair, the addresses of the word conductors on the fixed memory planes on the rear faces of the cards progress from high to low. The conductive strips, not represented on FIG. 2B, of the command lines X extend vertically, beginning at contact pads 45 and then on the rear face of the card. FIG. 2B illustrates horizontal conductive strips, such as 49, related to sub-matrix 14A, and such as 50, related to sub-matrix 14B. Those horizontal strips are joined through plated holes with the aforementioned vertical strips, crossing in the form of an X, such that, if the addresses are selected in progressive order, the progression would go from low to high for the front face and from high to low for the rear face, although the vertical portions of command lines X are selected in the same order in the two cases.

The advantages of utilizing modules 35 have been mentioned previously. However, a problem is posed by the fact that the eight transistors are connected internally in four groups of two, considering the bases, and in two groups of four, considering the emitters. Thus, the addresses 0 to 15 of sub-matrix 14A (FIG. 5) are not dependent on a single command line Y, but depend on two. This problem may be resolved easily by taking into account this peculiarity in the establishment of the connections between the different stages of address register 17 (FIG. 1) and decoding device 18.

It is evident that the contact pads provided on the pluggable edges, both on the principal board 19 and the card-planes 20, are sufficient in number to assure the signal inputs and outputs, the inputs of the voltage supply, and the numerous ground connections. This is because on the lower left edge of the principal board 21, one out of two contact pads 25 is reserved for a ground connection in order that the outputs of the output-read amplifiers can be realized by bifilar lines of predetermined impedance.

Referring again to FIGS. 2A and 2B, it is to be realized that the signal paths are optimized by reason of their reduced length and their direct configurations without bends. Moreover, the different functions are distinctly separated. Because of this the address selection signals propagate upwardly from contact pads 25 at the lower edge of the right part of board 19, toward each switching sub-matrix (modules 35), and then horizontally toward the word conductors of memory planes 30. Next, the signals, representing a word code read out, propagate downwardly toward the bottom, experiencing a binary selection in the double output-read amplifiers 12, for exiting to the contact pads 25 at the lower edge of the left part of board 19.

When it is necessary to change the contents of the fixed memory, partially or totally, it is required only to replace one, or several, or the totality of card-planes 20 by others, the principal board 19, being on the whole of elements "standardized" but relatively more costly than the card-planes, remaining in place.

Much that has been described in the foregoing and that is represented on the drawing is characteristic of the invention. It is evident that one skilled in the art is able to adduce all modifications of form and of detail using his judgment, without departing from the scope of the invention.

We claim:

1. An assemblage element of circuits for connecting together a fixed resistor memory and its associated circuits comprising: a principal rectangular board, provided with an edge which has contact pads on its two faces by which the board is pluggable into a corresponding first connector, said board carrying at least one second connector on each of its two faces spaced apart from said edge, each second connector receiving a pluggable card-plane disposed parallel to and spaced apart from said principal board, each of said card-planes being composed of a rectangular board, which carries on each of its two faces, in addition to printed circuits, a resistor memory plane and a switching matrix for the selection of the word lines of the memory, said principal board carrying in addition, on each of its two faces, between said second connector and said contact pads, a plurality of read amplifiers coupled to the memory planes and a plurality of coupling circuits.

2. The assemblage element of claim 1, wherein on the pluggable edge of said principal board, the contact pads are divided into two groups, one group for the command inputs to the switching matrix and the other group for the outputs of the read amplifiers.

3. The assemblage element of claim 1, further including two upright-guides affixed on the sides of said principal board and comprising channels serving to guide said card-planes at the time of their plugging.

4. The assemblage element of claim 1, wherein on each card-plane, the resistor memory planes are disposed in a corner of the card-plane, so that the access terminals of the bit conductors extend parallel to the pluggable edge of the card-plane and so that the access terminals of the word conductors extend perpendicular to said edge and toward the middle of the card-plane.

5. The assemblage element of claim 4, wherein each switching sub-matrix is composed of a plurality of transistorized modules and is disposed in another corner of the card-plane so that the output terminals of the modules are aligned parallel and opposite to the access terminals of the word conductors of the corresponding memory plane.

6. The assemblage element of claim 5, wherein each constituent module of said sub-matrices includes eight transistors with internal coupling so that in each of the four pairs of transistors, the bases of the two transistors are connected together, and in each of the two groups of four transistors, the four emitters are connected together.

7. The assemblage element of claim 6, wherein each of said modules is of parallelepiped form and comprises, on one side, eight aligned collector outputs and, on the opposite side, two command emitter inputs and four command base inputs.

8. A circuit board assembly comprising a principal circuit board, said principal board being provided with a row of electrical contacts near one edge thereof for plugging into a corresponding first connector, a pair of additional circuit boards, each of said additional boards being provided with a row of electrical contacts, a pair of elongated second connectors, each of said second connectors mating with the row of contacts on a respective one of said additional boards and supporting said respective additional board, said second connectors being mounted on opposite sides of said principal board.

9. The circuit board assembly of claim 8 further including printed circuit members on said principal board coupling said electrical contacts of said principal board to each of said second connectors.

10. The circuit board assembly of claim 9 wherein said additional boards are supported by said second connectors to be spaced from said principal board such that the planes of all of said boards are parallel.

11. The circuit board assembly of claim 10 further including a memory plane supported on each side of said additional boards.

12. The circuit board assembly of claim 11 further including printed circuit members on said additional boards coupling said memory plane thereon to said electrical contacts of said additional board.

* * * * *